United States Patent
Golub et al.

(10) Patent No.: US 10,578,093 B2
(45) Date of Patent: Mar. 3, 2020

(54) FLEXIBLE TUBING HAVING A STABLE FLOW RATE AND METHODS FOR MAKING AND USING IT

(71) Applicant: Saint-Gobain Performance Plastics Corporation, Solon, OH (US)

(72) Inventors: Charles S. Golub, Westford, MA (US); Heidi Sardinha Lennon, Shrewsbury, MA (US); Mark T. White, Northboro, MA (US); Joshua Becker, Lima, OH (US); Lily Lei, Somerset, NJ (US); Gerald H. Ling, Wayland, MA (US)

(73) Assignee: Saint-Gobain Performance Plastics Corporation, Solon, OH (US)

( * ) Notice: Subject to any disclaimer, the term of this patent is extended or adjusted under 35 U.S.C. 154(b) by 0 days.

(21) Appl. No.: 15/934,866

(22) Filed: Mar. 23, 2018

(65) Prior Publication Data
US 2018/0274528 A1    Sep. 27, 2018

Related U.S. Application Data

(60) Provisional application No. 62/476,222, filed on Mar. 24, 2017.

(51) Int. Cl.
*F04B 43/08* (2006.01)
*F16L 11/06* (2006.01)
(Continued)

(52) U.S. Cl.
CPC ............... *F04B 43/08* (2013.01); *B32B 1/08* (2013.01); *C08L 23/12* (2013.01); *C08L 25/06* (2013.01);
(Continued)

(58) Field of Classification Search
CPC .......... F04B 43/08; F04B 43/12; F16L 11/06; C08L 23/12; C08L 25/06; C08L 2203/18;
(Continued)

(56) References Cited

U.S. PATENT DOCUMENTS

| 4,311,628 A | 1/1982 | Abdou-Sabet |
| 4,927,882 A | 5/1990 | Bayan |

(Continued)

FOREIGN PATENT DOCUMENTS

| EP | 0 969 043 A1 | 1/2000 |
| WO | WO 2010/051468 A2 | 5/2010 |

OTHER PUBLICATIONS

International Search Report issued in co-pending International Patent Application No. PCT/US2018/024193, European Patent Office, dated Jul. 5, 2018, 6 pages.

(Continued)

*Primary Examiner* — Michael C Miggins
(74) *Attorney, Agent, or Firm* — McDonnell Boehnen Hulbert & Berghoff LLP

(57) ABSTRACT

The present disclosure relates generally to flexible tubing, for example, suitable for use in peristaltic pumps. The present disclosure relates more particularly to flexible tubing having a stable flow rate despite being extruded from thermoplastic polymer and methods for making such tubing. In one aspect, at least 50% of the material volume of a flexible tubing of the disclosure is formed from a first polymer material that includes a continuous phase that includes polypropylene and a non-cross-linked styrene block copolymer elastomer miscible with the polypropylene, as well as, dispersed within the continuous phase (e.g., discontinuously dispersed within the continuous phase), a cross-linked rubber phase. The non-cross-linked styrene block copolymer elastomer is present in the first polymeric (Continued)

material in an amount in the range of 2 wt % to 15 wt %. In certain desirable embodiments of the flexible tubings described herein, the flexible tubing has a flow rate variation over the 480 hours of use of less than 20%.

22 Claims, 4 Drawing Sheets

(51) Int. Cl.
*C08L 23/12* (2006.01)
*C08L 25/06* (2006.01)
*B32B 1/08* (2006.01)
*F04B 43/12* (2006.01)

(52) U.S. Cl.
CPC ............ *F16L 11/06* (2013.01); *C08L 2203/18* (2013.01); *C08L 2205/025* (2013.01); *C08L 2205/035* (2013.01); *C08L 2205/22* (2013.01); *F04B 43/12* (2013.01)

(58) Field of Classification Search
CPC ......... C08L 2205/025; C08L 2205/035; C08L 2205/22; B32B 1/08
See application file for complete search history.

(56) References Cited

U.S. PATENT DOCUMENTS

| | | |
|---|---|---|
| 6,100,334 A | 8/2000 | Abdou-Sabet |
| 6,486,877 B1 | 11/2002 | Watanabe |
| 8,969,481 B2 | 3/2015 | Ellul et al. |
| 2006/0014903 A1 | 1/2006 | Vromman |
| 2006/0116474 A1 | 6/2006 | Jarus et al. |
| 2008/0033089 A1 | 2/2008 | Ellul et al. |
| 2012/0070597 A1 | 3/2012 | Siddhamalli et al. |

OTHER PUBLICATIONS

Written Opinion issued in co-pending International Patent Application No. PCT/US2018/024193, European Patent Office, dated Jul. 5, 2018, 6 pages.
ASTM D 1238-04, "Standard Test Method for Melt Flow Rates of Thermoplastics by Extrusion Plastometer" (2004).
ExxonMobil, "Santoprene(TM) TPV general introduction" (2014).
Kinsuk Naskar, "Dynamically vulcanized PP/EPDM thermoplastic elastomers—Exploring novel routes for crosslinking with peroxides," Ph.D. thesis, Unversity of Twente, Enschede, The Netherlands (2004).

FLEXIBLE TUBING HAVING A STABLE FLOW RATE AND METHODS FOR MAKING AND USING IT

CROSS-REFERENCE TO RELATED APPLICATIONS

The present application claims the benefit of priority of U.S. Provisional Patent Application No. 62/476,222, filed Mar. 24, 2017, which is hereby incorporated herein by reference in its entirety.

BACKGROUND OF THE DISCLOSURE

1. Field of the Disclosure

The present disclosure relates generally to flexible tubing, for example, suitable for use in peristaltic pumps. The present disclosure relates more particularly to flexible tubing having a stable flow rate despite being extruded from thermoplastic polymer and methods for making such tubing.

2. Technical Background

Pumps such as peristaltic pumps are conventionally used to provide a wide variety of fluids to a wide variety of processes. Flexible tubing is typically used in conjunction with such pumps. Elastomers are typically used as the base materials for such flexible tubing, as they can be processed via extrusion to provide tubing of virtually any desired length, and they are flexible enough to provide tubing that can be routed as desired and compressed by the rollers of a peristaltic pump.

For example, one conventional polymeric material for use in flexible tubing is a thermoplastic elastomer that includes two phases: a continuous polypropylene phase and a cross-linked rubber phase dispersed within the continuous polypropylene phase. Such materials are especially useful, for example, in the metered delivery of chemicals. However, the present inventors have determined that tubing made from such materials has an important disadvantage: the flow rate of liquid being pumped through such a flexible tubing (e.g., in a peristaltic pump) changes over time (i.e., under otherwise identical pumping conditions). The present inventors have determined that the flow rate can drop as much as 30% in the first several days of installation. This inconsistent flow rate can greatly complicate processes using the delivered chemicals, especially when the processes are strongly dependent on the amount of chemical provided. This is especially critical in applications in which cleaning solutions are dispensed through the tubing, as it can mean the difference between a clean final product and a dirty, unsanitary one.

What is needed are flexible tubing materials that have a stable flow rate, especially in the first several days after installation.

SUMMARY OF THE DISCLOSURE

In one aspect, the present disclosure provides a length of flexible tubing having an annular cross-section, the annular cross-section having an inner surface, an outer surface, an inner diameter and an outer diameter, the annular cross-section defining a wall thickness of the tubing, wherein at least 50% (e.g., at least 70%, at least 80%, or at least 90%) of the material volume of the tubing is formed from a first polymeric material comprising a continuous phase comprising polypropylene and a non-cross-linked styrene block copolymer elastomer miscible with the polypropylene; and dispersed within the continuous phase, a cross-linked rubber phase (e.g., discontinuously dispersed within the continuous phase), wherein the non-cross-linked styrene block copolymer elastomer is present in the first polymeric material in an amount in the range of 2 wt % to 15 wt %.

In certain desirable embodiments of the flexible tubings as described herein, the length of flexible tubing has a flow rate variation over 480 hours of less than 20%, e.g., less than 15%, or even less than 10%.

In another aspect, the disclosure provides a length of flexible tubing as otherwise described herein, in which the first polymeric feedstock is made by a method comprising providing a polymeric feedstock comprising
a continuous phase comprising polypropylene (e.g., semi-crystalline polypropylene); and
dispersed within the continuous phase, a discontinuous phase of a cross-linked rubber; and blending into the polymeric feedstock with one or more additives to form the polymeric materials, the one or more additives comprising the non-cross-linked styrene block copolymer elastomer.

In another aspect, a method for making a length of flexible tubing as described herein comprises
providing the first polymeric material; and
forming the first polymeric material into a length of flexible tubing, e.g., by extrusion.

In certain such embodiments, providing the first polymeric material comprises
providing a polymeric feedstock comprising
a continuous phase comprising polypropylene (e.g., semi-crystalline polypropylene); and
dispersed within the continuous phase, a discontinuous phase of a cross-linked rubber; and
blending into the polymeric feedstock with one or more additives to form the polymeric materials, the one or more additives comprising the non-cross-linked styrene block copolymer elastomer.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

As described above, the present inventors have noted that conventional flexible tubing can suffer undesirable flow rate changes over time, especially in the first several days of use. The present inventors have unexpectedly determined that a modification of the polymer material of the tubing can provide a flexible tubing that has a relatively low change in flow rate over time, especially within the first several days of use.

Figure 1:
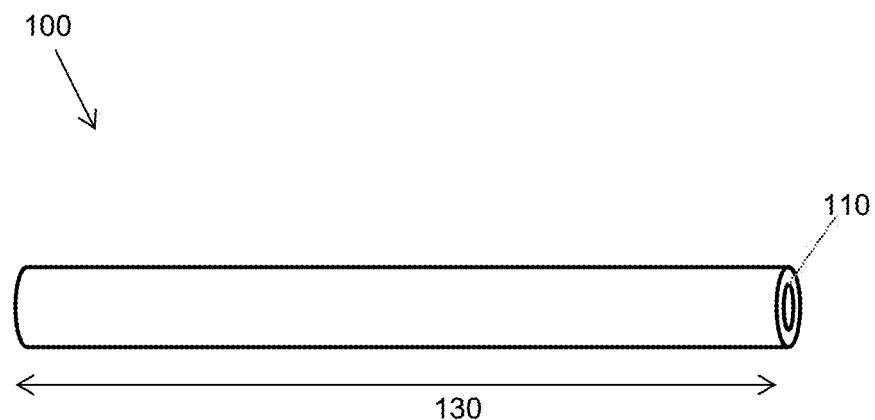
FIG. 1 is a schematic perspective view of a length of flexible tubing according to one aspect of the disclosure.
Figure 2:
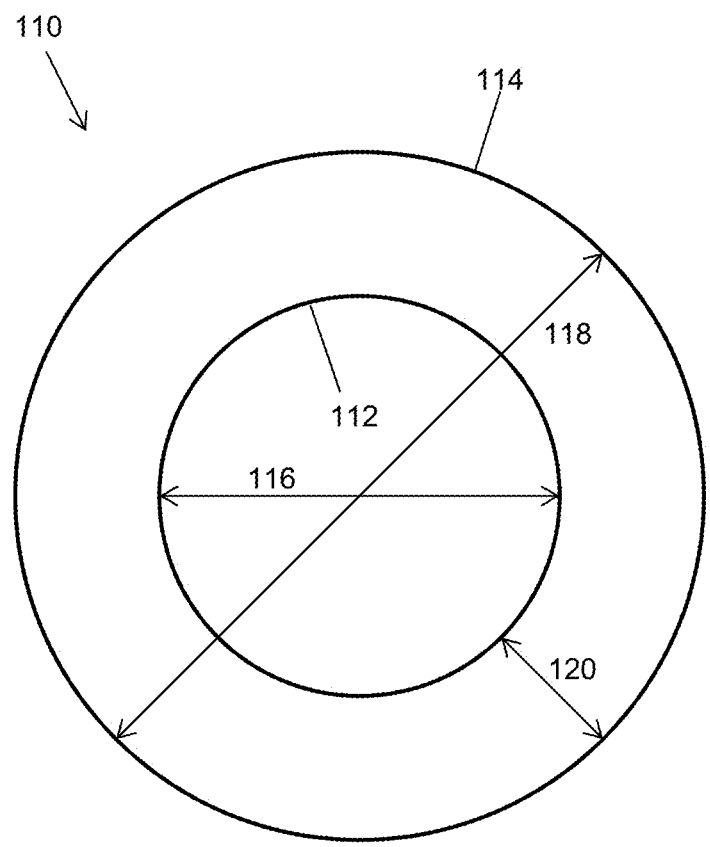
FIG. 2 is a schematic cross-sectional view of the length of flexible tubing of FIG. 1.

Accordingly, one aspect of the disclosure is a length flexible tubing having an annular cross-section, the annular cross-section having an inner surface, an outer surface, an inner diameter and an outer diameter, the annular cross-section defining a wall thickness of the tubing. Such a tubing is shown in schematic perspective view in FIG. 1, and in schematic cross-sectional view in FIG. 2. Flexible tubing 100 includes has an annular cross-section 110 (shown in detail in FIG. 2), which has an inner surface 112, an outer surface 114, an inner diameter 116 and an outer diameter 118. The inner diameter and the outer diameter define a wall thickness 120 of the tubing. Flexible tubing 100 also has a length 130.

Flexible tubing 100 is shown as being circular in overall shape. Of course, the person of ordinary skill in the art will appreciate that the tubing can be fabricated in other overall shapes, e.g., oval, elliptical, or polygonal. Similarly, while flexible tubing 100 is shown as having a radially constant wall thickness, the person of ordinary skill in the art will appreciate that in other embodiments, the wall thickness need not be constant. In such cases, the "wall thickness" is taken as the radially-averaged wall thickness. In certain desirable embodiments, the wall thickness at any one point along the circumference of the tubing is not less than 50% of the average wall thickness.

Notably, in this aspect of the disclosure, at least 50% of the material volume of the tubing is formed from a first polymer material that includes a continuous phase that includes polypropylene and a non-cross-linked styrene block copolymer elastomer miscible with the polypropylene, as well as, dispersed within the continuous phase (e.g., discontinuously dispersed within the continuous phase), a cross-linked rubber phase. The non-cross-linked styrene block copolymer elastomer is present in the first polymeric material in an amount in the range of 2 wt % to 15 wt %. In certain embodiments of the flexible tubings as otherwise described herein, the polypropylene is present in the first polymeric material in an amount in the range of 10 wt % to 70 wt %; and the cross-linked rubber is present in the first polymeric material in an amount in the range of 30 wt % to 85 wt %.

As noted above, at least 50% of the material volume of the flexible tubing is made up of this first polymeric material. As used herein, the "material volume" of the tubing is the volume of the material of the tubing itself, i.e., not including the volume of the channel bound by the tubing. This is the volume bound by the inner surface of the annular cross-section and the outer surface of the annular cross-section. In certain embodiments of the flexible tubing as otherwise described herein, at least 70%, at least 80%, or even at least 90% of the material volume of the flexible tubing is made up of the first polymeric material.

As described in more detail below, the flexible tubing of the present disclosure can be made by extrusion. Accordingly, it can be made in a wide variety of lengths. In certain embodiments, the length of a length of flexible tubing as otherwise described herein is at least 1 m. In various embodiments as otherwise described herein, the length of the length of flexible tubing is at least 2 m, at least 3 m, at least 5 m, or even at least 10 m.

The tubing can be made in a variety of sizes. For example, in certain embodiments of the flexible tubings as otherwise described herein, the inner diameter of the annular cross-section is in the range of 0.5 mm to 40 mm. In various particular embodiments of the flexible tubing as otherwise described herein, the inner diameter of the annular cross-section is in the range of 0.5 mm to 30 mm, or 0.5 mm to 20 mm, or 0.5 mm to 15 mm, or 0.5 mm to 10 mm, or 0.5 mm to 5 mm, or 1 mm to 40 mm, or 1 mm to 30 mm, or 1 mm to 20 mm, or 1 mm to 15 mm, or 1 mm to 10 mm, or 5 mm to 40 mm, or 5 mm to 30 mm, or 5 mm to 20 mm, or 5 mm to 15 mm, or 5 mm to 10 mm, or 10 mm to 40 mm, or 10 mm to 30 mm, or 10 mm to 20 mm. Similarly, in certain embodiments of the flexible tubings as otherwise described herein, the wall thickness of the annular cross-section is in the range of 0.5 mm to 15 mm. In various particular embodiments of the flexible tubing as otherwise described herein, the wall thickness of the annular cross-section is in the range of 0.5 mm to 12 mm, or 0.5 mm to 10 mm, or 0.5 mm to 8 mm, or 0.5 mm to 5 mm, or 0.5 mm to 3 mm, or 0.5 mm to 2 mm, or 1 mm to 15 mm, or 1 mm to 12 mm, or 1 mm to 10 mm, or 1 mm to 8 mm, or 1 mm to 5 mm, or 1 mm to 3 mm, or 2 mm to 15 mm, or 2 mm to 12 mm, or 2 mm to 10 mm, or 2 mm to 8 mm, or 2 mm to 5 mm, or 5 mm to 15 mm, or 5 mm to 12 mm, or 5 mm to 10 mm, or 5 mm to 8 mm.

Figure 3:
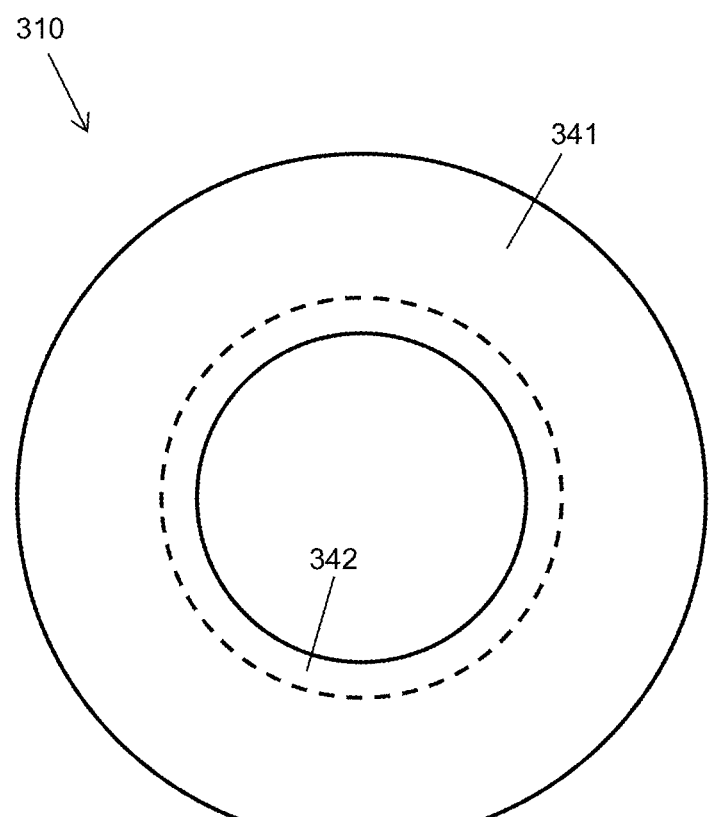
FIG. 3 is a schematic cross-sectional view of a length of flexible tubing according to one embodiment of the disclosure.

In certain embodiments, a flexible tubing as otherwise described herein can include a liner layer at the inner surface of the cross-sectional area. Such an embodiment is shown in schematic cross-sectional view in FIG. 3. The cross-section 310 of the flexible tubing of this embodiment has two layers; an outer layer 341 of the first polymeric material, and, disposed at the inner surface of the cross-sectional area, an inner layer 342 configured as a liner layer. As the person of ordinary skill in the art will appreciate, a liner layer can provide enhanced chemical resistance or other desirable performance to the tubing. The person of ordinary skill in the art will appreciate that a variety of conventional thermoplastic materials can be useful as a liner layer, depending on the particular fluid to be pumped through the tubing. For example, in certain embodiments, a tubing for use with a fuel might have a fluoropolymer layer as the liner layer. In other embodiments, different materials can be used as liners. Other suitable chemically-resistant liner materials include, for example, olefin-based polymers and blends thereof. Lined flexible tubings can be made, for example, via conventional co-extrusion methods. In certain embodiments, the material volume of the flexible tubing consists essentially of the first polymeric material and the liner layer (e.g., at least 90%, at least 95%, or at least 99% of the material volume of the flexible tubing is formed from the first polymeric material and the liner layer). Of course, in other embodiments, no liner layer is present.

In certain embodiments of the flexible tubing as otherwise described herein, the material volume of the flexible tubing consists essentially of the first polymeric material (e.g., at least 90%, at least 95%, or at least 99% of the material volume of the flexible tubing is formed from the first polymeric material).

As described above, the inventors have unexpectedly determined that the flexible tubings of the present disclosure can have a much lower flow rate variation over time, especially over the first several days of use, as conventional thermoplastic elastomer tubings. For example, in certain embodiments as otherwise described herein, the flexible tubing has a flow rate variation over the 480 hours of use of less than 20%. In certain such embodiments, the flexible tubing has a flow rate variation over the first 480 hours of use of less than 15%. And in certain especially desirable embodiments of the flexible tubings as otherwise described herein, the flexible tubing has a flow rate variation over the first 480 hours of use of less than 10%. As used herein, the flow rate variation is measured using a conventional peristaltic pump (Cole Parmer L/S Peristaltic Pump) with a conventional pump head (Cole Parmer EZ Load II pump head). Seven inches of the tubing is disposed in the pump head, and the pump drive is set to pump at 100 revolutions per minute with a 15 pounds per square inch backpressure. Pumping is performed in 5 minutes on/10 minutes off cycles over the test period; flow rate is monitored daily. The test is performed at 22° C. and at atmospheric pressure. The fluid to be pumped in the flow rate variation test is water.

As described in more detail below, the cross-linked rubber component and much (if not all) of the polypropylene component of the first polymeric material can be provided by a commercially-available multiphase material, such as those available under the trade names SANTOPRENE and UNIPRENE. These materials typically include a polypropylene continuous phase and a cross-linked rubber continuous phase dispersed therein. They can often also include an amount of an extender oil, e.g., a paraffin oil or a mineral oil. To make the first polymeric material, the non-cross-linked styrene block copolymer (along with any other desired additives, e.g., additional olefinic polymer, oil, mineral filler) can be blended into such a commercially-available multiphase material while retaining the multiphase nature of the material.

As described above, the first polymeric material has a continuous phase that comprises polypropylene. In certain embodiments, the polypropylene has a weight average molecular weight from about 200,000 to about 1,000,000, and a number average molecular weight from about 90,000 to 150,000; however, a wide variety of other molecular weights may be used. A variety of morphologies can be used, including non-crystalline, semi-crystalline and crystalline; however, in certain embodiments, at least 60% or even at least 80% of the polypropylene is semicrystalline polypropylene. For example, in certain embodiments of the flexible tubings as otherwise described herein, at least 60% or even at least 80% of the polypropylene has a crystallinity of at least 25% as measured by differential scanning calorimetry. As used herein, the term "polypropylene" encompasses not only purely homopolymeric polypropylene but also a propylene copolymer with at least 95 wt % (or even at least 98 wt %) propylene monomers.

As noted above and in further detail below, additional olefinic polymers (polypropylene and otherwise) can be added to a commercially-available multiphasic material. Accordingly, even when the multiphasic material provides at least semicrystalline polypropylene, there can be a fraction of polypropylene material with a different crystallinity. For example, in certain embodiments of the flexible tubings as otherwise described herein, at least 2%, at least 5%, at least 10%, or even at least 20% of the polypropylene is amorphous. However, in certain such embodiments, no more than 40% or no more than 20% of the polypropylene is amorphous.

The amount of the polypropylene in the first polymer material can be varied to provide a material with the desired processability and elastomeric properties. In certain embodiments of the flexible tubings as otherwise described herein, polypropylene is present in the first polymeric material in a total amount in the range of 10 wt % to 70 wt %. For example, in various particular embodiments of the flexible tubings as otherwise described herein, polypropylene is present in the first polymeric material in a total amount in the range of 10 wt % to 60 wt %, or 10 wt % to 50 wt %, or 10 wt % to 40 wt %, or 10 wt % to 30 wt %, or 20 wt % to 70 wt %, or 20 wt % to 50 wt %, or 20 wt % to 40 wt %, or 30 wt % to 70 wt %, or 30 wt % to 60 wt % or 30 wt % to 50 wt %, or 40 wt % to 70 wt %, or 40 wt % to 50 wt %, or 50 wt % to 70 wt %.

As described above, dispersed in the continuous phase is a cross-linked rubber. A wide variety of cross-linked rubbers are conventionally used in multiphasic elastomeric materials; may such rubbers are suitable for use in the flexible tubings described herein. For example, in certain advantageous embodiments of the flexible tubings as otherwise described herein, the cross-linked rubber is ethylene propylene diene monomer (M-class) rubber ("EPDM rubber"). As the person of ordinary skill in the art will appreciate, various dienes can be used in EPDM rubber, including, for example, dicyclopentadiene, ethylidene norbornene, and vinyl norbornene, and a variety of cross-linking chemistries may be used. The person of ordinary skill in the art is aware of a variety of cross-linked EPDM rubbers suitable for use in multiphasic elastomeric compositions; many commercially-available multiphasic elastomeric compositions are based on polyproylene and cross-linked EPDM rubber.

However, a variety of other cross-linked rubbers can be used. In certain embodiments of the flexible tubings as otherwise described herein, the cross-linked rubber is a silicone rubber. In other embodiments of the flexible tubings as otherwise described herein, the cross-linked rubber is a butyl rubber. In other embodiments of the flexible tubings as otherwise described herein, the cross-linked rubber is a nitrile rubber. In certain embodiments, the cross-linked rubber is not styrenic.

The amount of the cross-linked rubber in the first polymer material can be varied by the person of ordinary skill in the art based on the present disclosure to provide a material with the desired processability and elastomeric properties. In certain embodiments of the flexible tubings as otherwise described herein, the cross-linked rubber is present in the first polymeric material in a total amount in the range of 15 wt % to 85 wt %. For example, in various particular embodiments of the flexible tubings as otherwise described herein, polypropylene is present in the first polymeric material in a total amount in the range of 15 wt % to 80 wt %, or 15 wt % to 75 wt %, or 15 wt % to 65 wt %, or 15 wt % to 60 wt %, or 15 wt % to 50 wt %, or 15 wt % to 40 wt %, or 30 wt % to 85 wt %, or 30 wt % to 80 wt %, or 30 wt % to 75 wt %, or 30 wt % to 65 wt %, or 30 wt % to 60 wt %, or 30 wt % to 50 wt %, or 40 wt % to 85 wt %, or 40 wt % to 80 wt %, or 40 wt % to 75 wt %, or 40 wt % to 65 wt %, or 40 wt % to 60 wt %, or 50 wt % to 85 wt %, or 50 wt % to 80 wt %, or 50 wt % to 75 wt %, or 60 wt % to 85 wt %, or 60 wt % to 80 wt %.

The cross-linked rubber is, in certain desirable embodiments of the flexible tubings as otherwise described herein, cross-linked to an extent such that less than 5 wt % is extractable. Extractability is determined via a boiling xylene test, in which a thin film specimen is disposed in boiling xylene for 30 minutes, after which the dried residue is weighed, and suitable corrections for soluble and insoluble components are based upon knowledge of the composition or on analysis of the extractant.

Notably, the present inventors have unexpectedly determined that inclusion of a non-cross-linked styrene block copolymer elastomer in the composition can provide flexible tubings with improved flow stability. Accordingly, the first polymeric composition includes in the range of 2 wt % to 15 wt % of a non-cross-linked styrene block copolymer elastomer. The non-cross-linked styrene block copolymer elastomer is at least partially miscible with the polypropylene of the continuous phase (i.e., broadens or suppresses the $T_g$ of either component). In certain embodiments, the non-cross-linked styrene block copolymer elastomer is miscible with the polypropylene of the continuous phase.

A variety of non-cross-linked styrene block copolymer elastomers can be used in the flexible tubings described herein. When a commercially available polypropylene/cross-linked rubber multiphase material is used, the person of ordinary skill in the art can blend a desired amount of the non-cross-linked styrene block copolymer elastomer into the commercial material (e.g., optionally together with one or more of additional polypropylene, an additional olefinic polymer as described below, and an oil as described below).

For example, in certain embodiments of the flexible tubings as otherwise described herein, the non-cross-linked styrene block copolymer elastomer is a styrene-ethylene-propylene-styrene block copolymer ("SEPS"). Such materials are commercially available under the tradenames KRATON, SEPTON, HYBRAR and SIBSTAR.

In other embodiments of flexible tubings as otherwise described herein, the non-cross-linked styrene block copolymer elastomer is a styrene-isoprene-styrene block copolymer ("SIS"). Such materials are commercially available under the tradenames KRATON, SEPTON, HYBRAR and SIBSTAR.

In other embodiments of flexible tubings as otherwise described herein, the non-cross-linked styrene block copolymer elastomer is a styrene-ethylene-propylene block copolymer ("SEP"). Such materials are commercially available under the tradenames KRATON, SEPTON, HYBRAR and SIBSTAR.

In other embodiments of flexible tubings as otherwise described herein, the non-cross-linked styrene block copolymer elastomer is a styrene-ethylene-(ethylene-propylene)-styrene block copolymer ("SEEPS"). Such materials are commercially available under the tradename SEPTON.

In other embodiments of flexible tubings as otherwise described herein, the non-cross-linked styrene block copolymer elastomer is a styrene-ethylene-butylene-styrene block copolymer ("SEBS"). Such materials are commercially available under the tradenames KRATON and SEPTON. However, in certain advantageous embodiments of the flexible tubings as otherwise described herein, the non-cross-linked styrene block copolymer elastomer does not include SEBS.

Thus, in certain embodiments of the flexible tubings as otherwise described herein, the-cross-linked styrene block copolymer elastomer is one or more of SIS, SEPS, SEEPS, SEP and SEBS. In various particular embodiments of the flexible tubings as otherwise described herein, the-cross-linked styrene block copolymer elastomer is one or more of SIS, SEPS, SEEPS and SEP, or is one or more of SEPS, SEEPS and SEP.

Based on the present disclosure, the person of ordinary skill in the art will select a non-cross-linked styrene block copolymer elastomer with suitable hardness, modulus, and other properties for use in the flexible tubings described herein. For example, in certain embodiments of the flexible tubings as otherwise described herein, the non-cross-linked styrene block copolymer elastomer (i.e., itself) has a hardness of Shore A 30-90. And in certain embodiments of the flexible tubings as otherwise described herein, the non-cross-linked styrene block copolymer elastomer (i.e., itself) has a 100% tensile modulus in the range of 0.7-2 MPa, for example, in the range of 1 to 1.6 MPa, or 1.2 to 1.4 MPa (e.g., 1.3 MPa).

In certain embodiments of the flexible tubings as otherwise described herein, the non-cross-linked styrene block copolymer elastomer is melt processable. A melt processable material is one that has a non-zero melt flow rate that is measurable by ASTM D 1238-04, which is hereby incorporated herein by reference in its entirety, under Condition 190/2.16.

Based on the disclosure herein, the amount of the non-cross-linked styrene block copolymer elastomer can be varied to provide the desired properties to the flexible tubing. For example, in certain embodiments of the flexible tubings as otherwise described herein, the non-cross-linked styrene block copolymer elastomer is present in the first polymeric material in an amount in the range of 2 wt % to 10 wt %. In other embodiments of the flexible tubings as otherwise described herein, the non-cross-linked styrene block copolymer elastomer is present in the first polymeric material in an amount in the range of 4 wt % to 15 wt %. In various embodiments of the flexible tubings as otherwise described herein, the non-cross-linked styrene block copolymer elastomer is present in the first polymeric material in an amount in the range of 2 wt % to 12 wt %, or 2 wt % to 8 wt %, or 4 wt % to 12 wt %, or 4 wt % to 10 wt %, or 6 wt % to 15 wt %, or 6 wt % to 12 wt %, or 6 wt % to 10 wt %.

One or more oils may be present in the first polymeric material. For example, commercial polypropylene/cross-lined rubber multiphase compositions often have an amount of extender oil added, for example, to aid in processability of the rubber component. And as otherwise described herein, oil can be added together with the non-cross-lined styrene block copolymer elastomer when blending it with a commercial polypropylene/cross-lined rubber multiphase composition. A variety of oils can be present in the first polymeric material, such as paraffinic oils, mineral oils, dearomaticzed aliphatic hydrocarbons, high purity hydrocarbon fluids, polyalphaolefins and polybutenes. To be properly considered an "oil" as used herein, a substance must be a liquid at 25° C. In certain embodiments of the flexible tubings as otherwise described herein, one or more oils are present in an amount up to 30 wt %. In various embodiments of the flexible tubings as otherwise described herein, one or more oils are present in an amount up to 25 wt %, up to 20 wt %, up to 15 wt %, or up to 10 wt %.

As the person of ordinary skill in the art will appreciate, and as described below, the first polymeric material may include a variety of additional components. However, in certain desirable embodiments of the flexible tubings described herein, at least 80 wt %, at least 85 wt %, or even at least 90 wt % of the first polymeric material is polypropylene, cross-linked rubber, non-cross-linked styrene block copolymer elastomer and oil.

In certain embodiments of the flexible tubings as otherwise described herein, the first polymer material further includes an alpha olefin polymer (i.e., other than the polypropylene) in an amount up to 10 wt %. The alpha olefin polymer can be, for example, an alpha olefin elastomer, such as those available under the tradenames NOTIO and TAFMER. The alpha olefin polymer can be, for example, a copolymer of two or more of ethylene, propylene and 1-butene olefin polymer. The alpha olefin copolymer is at least partially miscible (e.g., miscible) with the polypropylene in the continuous phase.

In certain embodiments of the flexible tubings as otherwise described herein, the first polymeric material further includes an inorganic filler. The inorganic filler can be provided as particles dispersed throughout the first polymeric material. The inorganic filler can be reinforcing or non-reinforcing, and can serve a variety of other purposes as would be apparent to the person of ordinary skill in the art. For example, in certain embodiments of the flexible tubings as otherwise described herein, the inorganic filler is one or more of calcium carbonate, silica, (e.g., a functional silica or a fumed silica), clay, carbon (e.g., carbon black), talc and titanium dioxide. In certain embodiments of the flexible tubings as otherwise described herein, the inorganic filler is present in the first polymeric material in an amount up to 10 wt %. In various embodiments of the flexible tubings as otherwise described herein, the inorganic filler is present in the first polymeric material in an amount up to 5 wt %, or up to 3 wt %.

As the person of ordinary skill in the art would appreciate, a number of other additives may be present in the first polymeric material, such as leftover curing agent (i.e., from the curing of the cross-linked rubber), antioxidants, flame retardants, acid scavengers, anti-static agents and processing aids such as melt flow index enhancers.

The person of ordinary skill in the art will, based on the disclosure herein, provide a first polymeric material having desirable properties for a flexible tubing. For example, in certain embodiments of the flexible tubings as otherwise described herein, the first polymeric material has a Shore A Hardness in the range of 55-70. And in certain embodiment of the flexible tubings as otherwise described herein, the first polymeric material has a tensile stress at 100% elongation in the range of 800-1050 pounds per square inch.

As the person of ordinary skill in the art will appreciate, the first polymer composition can be prepared in a variety of fashions. For example, the first polymer composition can be made by providing a polypropylene/cross-linked polymer multiphase composition (e.g., as commercially available) as a polymeric feedstock, and blending one or more additives including the non-cross-linked styrene block copolymer elastomer into the polymeric feedstock. Thus, in certain embodiments of the flexible tubings as otherwise described herein, the first polymeric material is made by a method that includes providing a polymeric feedstock including a continuous phase comprising polypropylene (e.g., semi-crystalline polypropylene), and dispersed within the continuous phase, a discontinuous phase of a cross-linked rubber; and combining with the polymeric feedstock with one or more additives to form the polymeric materials, the one or more additives comprising the non-cross-linked styrene block copolymer elastomer.

The polymeric feedstock can, for example, include polypropylene in an amount in the range of 15 wt % to 70 wt %; and the cross-linked rubber in an amount in the range of 30 wt % to 85 wt %. The person of ordinary skill in the art will appreciate that the polymeric feedstock can also include other components. For example, in many embodiments, the polymeric feedstock can include an oil, e.g., an extender oil for the cross-linked rubber.

As noted above, the one or more additives are blended into the polymeric feedstock. The one or more additives include the non-cross-linked styrene block copolymer elastomer. The person of ordinary skill in the art can use any desired blending method to blend the one or more additives into the polymeric feedstock. For example, the blending can be performed by extrusion, e.g., by twin-screw extrusion. The blending can be performed at an elevated temperature, e.g., in the range of at a temperature in the range of 130-200° C., e.g., about 165° C. Notably, the blending can be performed in the absence of solvent.

The one or more additives blended into the polymeric feedstock can, in addition to the non-cross-linked styrene block copolymer elastomer, include polypropylene in an amount up to 15 wt % of the polymeric material. As described above, the polypropylene of the additive can be, for example, an amorphous polypropylene.

The one or more additives blended into the polymeric feedstock can, in addition to the non-cross-linked styrene block copolymer elastomer, include an alpha olefin polymer as described above. The alpha olefin polymer can be provided, for example, in an amount up to 10 wt % of the first polymeric material. In certain embodiments, the alpha olefin polymer is a copolymer of two or more of ethylene, propylene and 1-butene, e.g., available under the tradenames NOTIO and TAFMER.

The one or more additives blended into the polymeric feedstock can, in addition to the non-cross-linked styrene block copolymer elastomer, include an oil, as described above. For example, the oil can be provided in an amount up to 15 wt % of the first polymeric material.

The one or more additives blended into the polymeric feedstock can, in addition to the non-cross-linked styrene block copolymer elastomer, include an inorganic filler. The inorganic filler can be as described above. For example, in the inorganic filler can be calcium carbonate in an amount up to 5 wt % of the first polymeric material.

The person of ordinary skill in the art can prepare the flexible tubings of the disclosure using conventional methods. For example, in one embodiment, a method for making a length of flexible tubing as described herein includes providing the first polymeric material, and forming the first polymeric material into the length of flexible tubing, e.g., by extrusion. Conventional extrusion methods can be used to provide the length of flexible tubing.

In certain embodiments of the methods of making the flexible tubings as otherwise described herein, the providing of the first polymeric material includes
providing a polymeric feedstock comprising
a continuous phase comprising polypropylene (e.g., semi-crystalline polypropylene); and
dispersed within the continuous phase, a discontinuous phase of a cross-linked rubber; and
blending into the polymeric feedstock with one or more additives to form the polymeric materials, the one or more additives comprising the non-cross-linked styrene block copolymer elastomer.
Such methods can be performed as described throughout the present disclosure.

Another aspect of the disclosure is a flexible tubing made according to a method as described herein.

The flexible tubings as described herein are especially useful in the transmission of liquids. Accordingly, another aspect of the disclosure is a method for transmitting a liquid by providing a flexible tubing as described herein, and flowing the liquid through the tubing from a first end to a second end thereof. The liquid can be, for example, an aqueous liquid, such as an aqueous caustic (e.g., aqueous NaOH or aqueous KOH); an aqueous acid (e.g., aqueous acetic acid, aqueous hydrochloric acid, aqueous sulfuric acid, aqueous nitric acid or aqueous phosphoric acid); an aqueous surfactant; or an aqueous oxidant (e.g., aqueous sodium hypochlorite, aqueous sodium percarbonate, aqueous sodium hydroxide). But the person of ordinary skill in the art will appreciate that a wide variety of other aqueous liquids and even other types of liquids can be used. In certain desirable embodiments of the methods of use as otherwise described herein, the liquid is pumped through the tubing, for example, using peristaltic pumping. The flexible tubing can be provided in a variety of lengths. For example in certain embodiments of the methods as otherwise described herein, the flexible tubing has a length from its first end to its second end in the range of 1 foot to 20 feet, e.g., 1 foot to 10 feet, or 1 foot to 6 feet, or 2 feet to 20 feet, or 2 feet to 10 feet, or 2 feet to 6 feet, or 5 feet to 20 feet, or 5 feet to 10 feet.

Notably, the transmission of the liquid through the tubing can be performed at a relatively constant flow rate, even when the transmission of liquid is the first transmission of liquid through the length of flexible tubing. For example, in certain embodiments of the methods as otherwise described herein, the transmission is performed such that it is the first transmission of liquid through the length of flexible tubing, and wherein the flow rate changes over the first 480 hours of such by less than 20%, e.g., less than 15%, or even less than 10%. Here, the determination is not performed using the test method described herein, but rather in the actual conditions of use. And because the flow rate of the tubing itself can be relatively stable over the first 480 hours of use as described herein, when using pumping to transmit the liquid through the tugging, the pumping parameters can be substantially invariant over the first 480 hours of use.

EXAMPLES

Various aspects of the flexible tubings and methods of the disclosure are further described with respect to the non-limiting examples described below.

Example 1

Test tubings 1 and 2, summarized in the table below, were prepared as follows. A commercially-available polypropylene/EPDM multiphase elastomer (SANTOPRENE 281-64STG), a random polypropylene (Flint Hills Resources P5M6K), and SEPS block copolymer (Hybrar 7125) were tumble blended, then fed into a 30 mm Leistritz Twin Screw Extruder, into which calcium carbonate powder was powder-fed, and mineral oil (Sonnenborn Kaydol "White" mineral oil) was liquid-fed. The materials were blended in the twin screw extruder at about 330° F., and the blended material was extruded using a single screw extruder to form a 0.250" Inside diameter by 0.448" outside diameter tubing.

| # | Santoprene (%) | Polypropylene (%) | Mineral Oil (%) | CaCO3 (%) | SEPS (%) |
|---|---|---|---|---|---|
| 1 | 79 | 8 | 7.5 | 1.5 | 4 |
| 2 | 79 | 4 | 7 | 2 | 8 |

Figure 4:
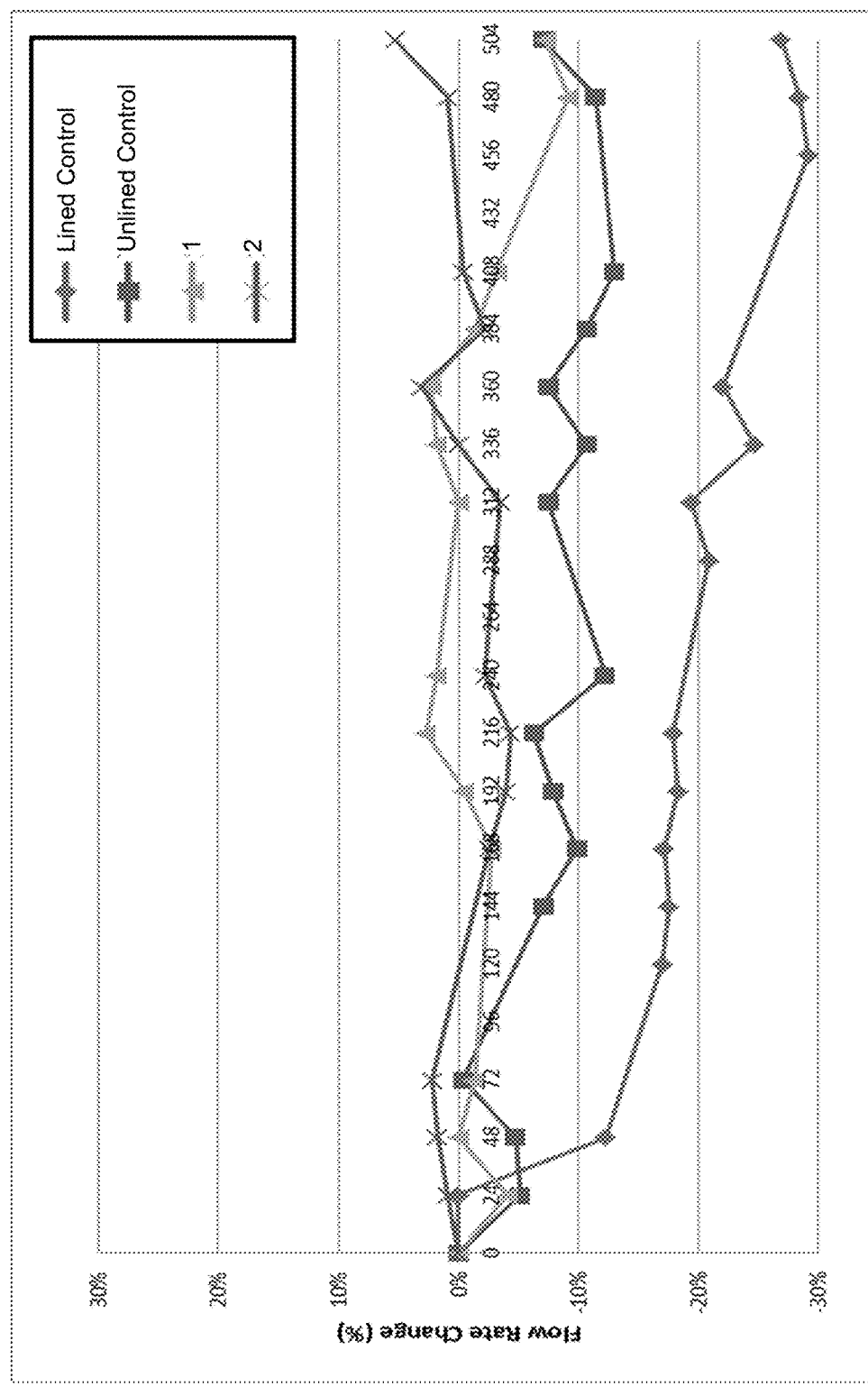
FIG. 4 is a graph showing the flow rate stability of two test tubings according to the present disclosure.

To measure the flow rate stability, the tubings were cut to 10" lengths and water was pumped through the tubings using Cole Parmer pumps with EZ Load II pump heads intermittently (5 minutes of pumping with 10 minutes of off time). The flow rate was measured every 24 hours during normal working hours (weekends and holidays were skipped). The flow rate stability results are shown in FIG. 4. Notably, while the comparative unlined and lined tubings suffered significant drift over the first 480 hours of use, test tubings 1 and 2 showed less than 10% drift from the original flow rate value. Without intending to be bound by theory, the inventors believe that this the stability of the flow is a rheological effect, and the addition of the SEPS plays a significant role in modifying the long term rheology of the polypropylene (e.g., flow over time).

In test tubings 1 and 2, mineral oil was added to the commercially-available polypropylene/EPDM multiphase elastomer. In a further set of experiments, test tubings were made without the addition of oil, using SANTOPRENE 281-64STG, NOTIO 3560, and either HYBRAR 7125 (SEPS) or HYBRAR 5125 (SIS). Materials were blended and extruded as described above; ingredients are shown in the table below.

| # | Santoprene (%) | Notio (%) | Elastomer (%) |
|---|---|---|---|
| 3 | 80 | 5 | SEPS-15 |
| 4 | 85 | 5 | SIS-10 |

Figure 5:
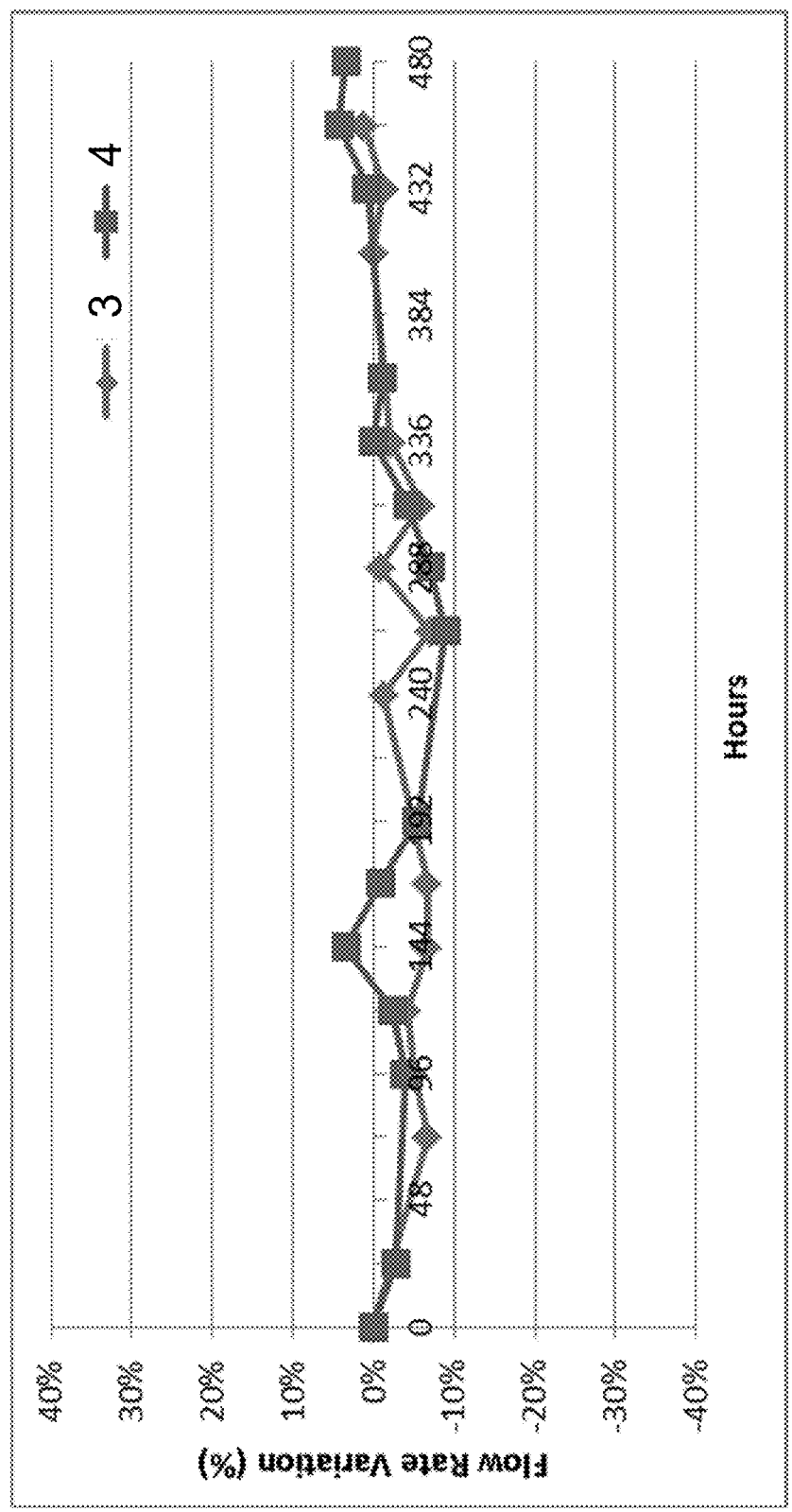
FIG. 5 is a graph showing the flow rate stability of two more test tubings according to the present disclosure.

Flow rates were determined as described above, and are shown graphically in FIG. 5. The data demonstrate superior flow rate stability, even in the absence of added mineral oil.

Another example of a material suitable for use includes elastomers SANTOPRENE 271-55, 80 wt % and SANTOPRENE 271-64, 2.5 wt %; a random polypropylene (Flint Hills Resources P5M6K), 2.5%; SEPS block copolymer (HYBRAR 7125), 10 wt %; and calcium carbonate, 5 wt %. This material can be processed as described above with reference to tubings 1-4, and formed into tubings, with or without a liner as described above.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:

1. A length of flexible tubing having an annular cross-section, the annular cross-section having an inner surface, an outer surface, an inner diameter and an outer diameter, the annular cross-section defining a wall thickness of the tubing, wherein at least 50% of the material volume of the tubing is formed from a first polymeric material comprising
    a continuous phase comprising polypropylene and a non-cross-linked styrene block copolymer elastomer miscible with the polypropylene; and
    dispersed within the continuous phase, a cross-linked rubber phase,
wherein
    the non-cross-linked styrene block copolymer elastomer is present in the first polymeric material in an amount in the range of 2 wt % to 15 wt %.

2. The length of flexible tubing according to claim 1, having a length of at least 1 m, an inner diameter in the range of 0.5 mm to 40 mm and a wall thickness in the range of 0.5 mm to 15 mm.

3. The length of flexible tubing according to claim 1, wherein at least 80% of the polypropylene is semicrystalline polypropylene.

4. The length of flexible tubing according to claim 1, wherein at least 5% of the polypropylene is noncrystalline polypropylene.

5. The length of flexible tubing according to claim 1, wherein the polypropylene is present in the first polymeric material in an amount in the range of 10 wt % to 70 wt %.

6. The length of flexible tubing according to claim 1, wherein the cross-linked rubber is an EPDM rubber, a silicone rubber, a butyl rubber, or a nitrile rubber.

7. The length of flexible tubing according to claim 1, wherein the cross-linked rubber is present in the first polymeric material in an amount in the range of 30 wt % to 85 wt %.

8. The length of flexible tubing according to claim 1, wherein the non-cross-linked styrene block copolymer elastomer is one or more of SIS, SEPS, SEEPS and SEP.

9. The length of flexible tubing according to claim 1, wherein the non-cross-linked styrene block copolymer elastomer is SEBS.

10. The length of flexible tubing according to claim 1, wherein the non-cross-linked styrene block copolymer elastomer is not SEBS.

11. The length of flexible tubing according to claim 1, wherein the non-cross-linked styrene block copolymer elastomer has a hardness of 30 to 90 on the Shore A scale and a tensile modulus of 1 MPa to 1.6 MPa.

12. The length of flexible tubing according to claim 1, wherein the first polymeric material further comprises one or more oils in an amount up to 30 wt %.

13. The length of flexible tubing according to claim 1, wherein the first polymer material further comprises an alpha olefin polymer, for example, in an amount up to 10 wt %.

14. The length of flexible tubing according to claim 1, wherein the first polymeric material further comprises an inorganic filler in an amount up to 10 wt %.

15. The length of flexible tubing according to claim 1, wherein the first polymeric material has a Shore A Hardness in the range of 50-75.

16. A length of flexible tubing according to claim 1, wherein at least 80% of the material volume of the tubing is formed from the first polymeric material.

17. The length of flexible tubing according to claim 1, having a flow rate variation over 480 hours of less than 20%.

18. A length of flexible tubing according to claim 17, having a flow rate variation over 480 hours of less than 10%.

19. The length of flexible tubing according to claim 1, having a liner layer at its inner surface.

20. The length of flexible tubing according to claim 19, wherein the material volume of the flexible tubing consists essentially of the first polymeric material, or of the first polymeric material and the liner layer.

21. A method for making a length of flexible tubing according to claim 1, comprising
providing the first polymeric material; and
forming the first polymeric material into a length of flexible tubing,
wherein providing the first polymeric material comprises
providing a polymeric feedstock comprising
a continuous phase comprising polypropylene; and
dispersed within the continuous phase, a discontinuous phase of a cross-linked rubber; and
blending into the polymeric feedstock with one or more additives to form the polymeric materials, the one or more additives comprising the non-cross-linked styrene block copolymer elastomer.

22. A method for transmitting a liquid, comprising
providing a length of flexible tubing according to claim 1; and
flowing the liquid through the flexible tubing from a first end to a second end thereof.

* * * * *